US007129890B1

(12) United States Patent
Redi et al.

(10) Patent No.: US 7,129,890 B1
(45) Date of Patent: Oct. 31, 2006

(54) DYNAMIC BEAMFORMING FOR AD HOC NETWORKS

(75) Inventors: Jason Keith Redi, Belmont, MA (US); Stephen R. Kolek, Lexington, MA (US)

(73) Assignees: Verizon Corporate Services Group Inc., Waltham, MA (US); BBN Technologies Corp., Cambridge, MA (US)

( * ) Notice: Subject to any disclaimer, the term of this patent is extended or adjusted under 35 U.S.C. 154(b) by 304 days.

(21) Appl. No.: 10/800,854

(22) Filed: Mar. 16, 2004

(51) Int. Cl.
*H04B 7/00* (2006.01)
*H01Q 3/00* (2006.01)

(52) U.S. Cl. .................. 342/367; 342/377
(58) Field of Classification Search ............ 342/377, 342/367
See application file for complete search history.

(56) References Cited

U.S. PATENT DOCUMENTS

| 6,246,366 B1* | 6/2001 | Speight ............... 342/457 |
| 6,611,231 B1* | 8/2003 | Crilly et al. ............ 342/378 |
| 6,795,018 B1* | 9/2004 | Guo ..................... 342/372 |
| 2001/0003443 A1* | 6/2001 | Velazquez et al. ...... 342/367 |

OTHER PUBLICATIONS

Yang, Jun et al, "MAC Protocol for Mobile Ad Hoc Network with Smart Antennas," Electronic Letters, Mar. 2003, vol. 39, No. 6, pp. 555-557.*
Singh, H. et al, "A MAC Protocol Based on Adaptive Beamforming for Ad Hoc Networks," 14th IEEE 2003 International Symposium on Personal, Indoor and Mobile Radio Communication Proceedings, Sep. 2003, pp. 1346-1350.*
Bandyopadhyay, S. et al, "An Adpative MAC Protocol for Wireless Ad Hoc Community Network (WACNet) Using Electronically Steerable Passive Array Radiator Antenna," IEEE Global Telecommunications Conference, Nov. 2001, pp. 2896-2900.*
Sanchez, Ricarda et al, "RDRN: A Rapidly Deployable Radio Network-Implementation and Experience,"IEEE 1998 Internatioanl Conference on Universal Persoal Communications, Oct. 1998, pp. 93-97.*
"Optimum Combining in Digital Mobile Radio with Cochannel Interference"; Jack H. Winters; IEEE Journal on Selected Areas in Communications, vol. SAC-2, No. 4; Jul. 1984; pp. 528-539.
"Hybrid-Selection/Optimum Combining"; Jack H. Winters et al.; 0-7803-6728-6/01, 2001 IEEE; pp. 113-117.
"Application of Antenna Arrays to Mobile Communications, Part II: Beam-Forming and Direction-of-Arrival Considerations"; Lal C. Godara; Proceedings of the IEEE, vol. 85, No. 8; Aug. 1997; pp. 1195-1245.

* cited by examiner

*Primary Examiner*—Gregory C. Issing

(57) ABSTRACT

A method, a node and a machine-readable medium are provided for dynamically adjusting a beam of an adaptive antenna array (302). A receiving node (101) receives, via a group of antenna array elements (302), a signal from a transmitting node (101). Each received signal from the antenna array elements (101) is digitized and recorded. K+1 output signals are generated from the recorded digitized signal. The k+1 output signals are generated by applying each of a group of weight sets to the recorded digitized signal. Each of the weight sets corresponds to a different one of k known neighboring nodes (101) and a weight set for generating an omnidirectional propagation pattern. Which one of the k+1 output signals to process is determined. The determined one of the k+1 output signals is processed and the packet encoded in the determined one of the k+1 output signals is decoded.

44 Claims, 9 Drawing Sheets

DYNAMIC BEAMFORMING FOR AD HOC NETWORKS

TECHNICAL FIELD

Implementations consistent with the principles of the invention, relate to the field of wireless communications and, more particularly, to systems and methods for using adaptive antenna arrays to perform dynamic beamforming in wireless networks.

BACKGROUND OF THE INVENTION

Omnidirectional antennas can detect and generate signals equally well in all directions. Even when a location of a remote communication device is known, however, transmissions to the remote device via an omni-directional antenna can cause energy to be transmitted in wrong directions as well as the right direction. Similarly, when receiving transmissions from a remote device via an omnidirectional antenna, signals from the remote device may be received, as well as interfering signals from devices in different locations around the omnidirectional antenna. The amount of interfering signals may be high, especially if transmitting devices also use omnidirectional antennas.

A switched beam antenna may transmit or receive signals using one of a number of predetermined beams. The antenna may use any one of the predetermined beams that is expected to provide the strongest signal between the antenna and an intended communication device. Thus, a switched beam antenna may provide less interference than an omnidirectional antenna because signals are not transmitted and received in all directions, but are transmitted and received, more or less, in a direction of interest. Further, because transmission and reception are directed in a particular direction, the range of transmission and reception may be increased in the particular direction.

Unlike switched beam antennas, adaptive array antennas do not have predetermined beams. An adaptive array, or electrically steerable, antenna permits a gain pattern to be dynamically modified. Adaptive array antennas include a number of array elements attached to separate antennas. Each array element may transmit or receive a radio frequency (RF) signal simultaneously. Given different gains and/or phases applied to each array element (weights), arbitrary constructive and destructive propagation patterns can effectively be created, thereby causing antenna patterns of gains and nulls.

Typically, adaptive array antennas are used to steer a beam in a previously known direction. This is a difficult task in a wireless network, such as an ad hoc network in which all nodes are moving and signals may be received from any direction at any time. Therefore, there is a need for an adaptive array antenna that can perform dynamic beamforming on a signal arriving from any direction.

SUMMARY OF THE INVENTION

Systems and methods consistent with the principles of the invention may receive signals from a transmitting source and determine weights for dynamically adapting elements of an antenna array.

In a first aspect of the invention, a method for dynamically adjusting a beam of an adaptive antenna array is provided. A receiving node receives, via a group of antenna array elements, a signal from a transmitting node. Each received signal from the antenna array elements is digitized and recorded. K+1 output signals are generated from the recorded digitized signal by applying each of a group of weight sets to the digitized signal. Each of the weight sets corresponds to a different one of k known neighboring nodes and a weight set for generating an omnidirectional propagation pattern. Which one of the k+1 output signals to process is determined. The determined one of the k+1 output signals is processed and the packet encoded in the one of the k+1 output signals is decoded.

In a second aspect of the invention, a node configured to operate in a wireless network is provided. The node includes a transceiver and a processor connected to the transceiver. The transceiver includes a group of antenna array elements and a memory. The transceiver is configured to receive a signal, from a transmitting node, via the group of antenna array elements, and detect a beginning of a packet in the signal. The transceiver is further configured to store, in the memory, respective portions of the signal received via corresponding ones of the antenna array elements. The processor is configured to access the stored portions of the received signal from the memory and generate output signals based on the stored portions of the received signal. Each of the output signals is generated using a different one of a group of weight sets. The weight sets correspond to k known neighboring nodes and a weight set for generating an omnidirectional propagation pattern. The processor is further configured to determine which one of the k+1 output signals to process, process the one of the k+1 output signals and decode the packet encoded in the one of the k+1 output signals.

In a third aspect of the invention, a machine-readable medium having instructions recorded thereon for a processor is provided. When the instructions are executed by the processor, the processor is configured to access a group of recorded waveforms in a memory. Each of the recorded waveforms was received via a different one of a group of antenna array elements. The processor is further configured to apply each of k+1 weight sets to the recorded waveforms to generate k+1 output signals. K of the weight sets correspond to predetermined weights sets for each of k known neighboring nodes and one of the weight sets is a predetermined weight set for generating an omnidirectional propagation pattern. The processor is further configured to determine which one of the k+1 output signals to process and process the determined one of k+1 output signals. The processing includes decoding a received packet included in the one of the k+1 output signals.

In a fourth aspect of the invention a node configured to operate in a wireless network is provided. The node includes means for receiving a signal from a transmitting node via a group of antenna array elements, means for storing a representation of the received signal, means for generating a group of output signals by applying each of a group of weight sets to the representation of the received signal, where k of the weight sets correspond to k known neighboring nodes and one of the weight sets is a predetermined weight set for propagating an omnidirectional pattern, means for determining which one of the output signals to process, and means for processing and for decoding the determined one of the plurality of output signals.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Operating Environment

One type of wireless network is an "ad-hoc" network. In an ad-hoc network, nodes may cooperatively route traffic among themselves. Network nodes in these networks may not be permanent: they are, instead, based on whether signals can be adequately decoded between two nodes. The network may adjust dynamically to changing node conditions, which may result from node mobility or failure.

In general, some or all of the nodes in an ad-hoc network are capable of network routing functions ("routers"), while other nodes may be merely source or destinations for data traffic ("endpoints"). All nodes in the network may execute a set of algorithms and perform a set of networking protocols that enable the nodes to find each other, determine paths through the network for data traffic from source to destination, and detect and repair ruptures in the network as nodes move, fail, as battery power changes, and as communication path characteristics change over time.

Figure 1:
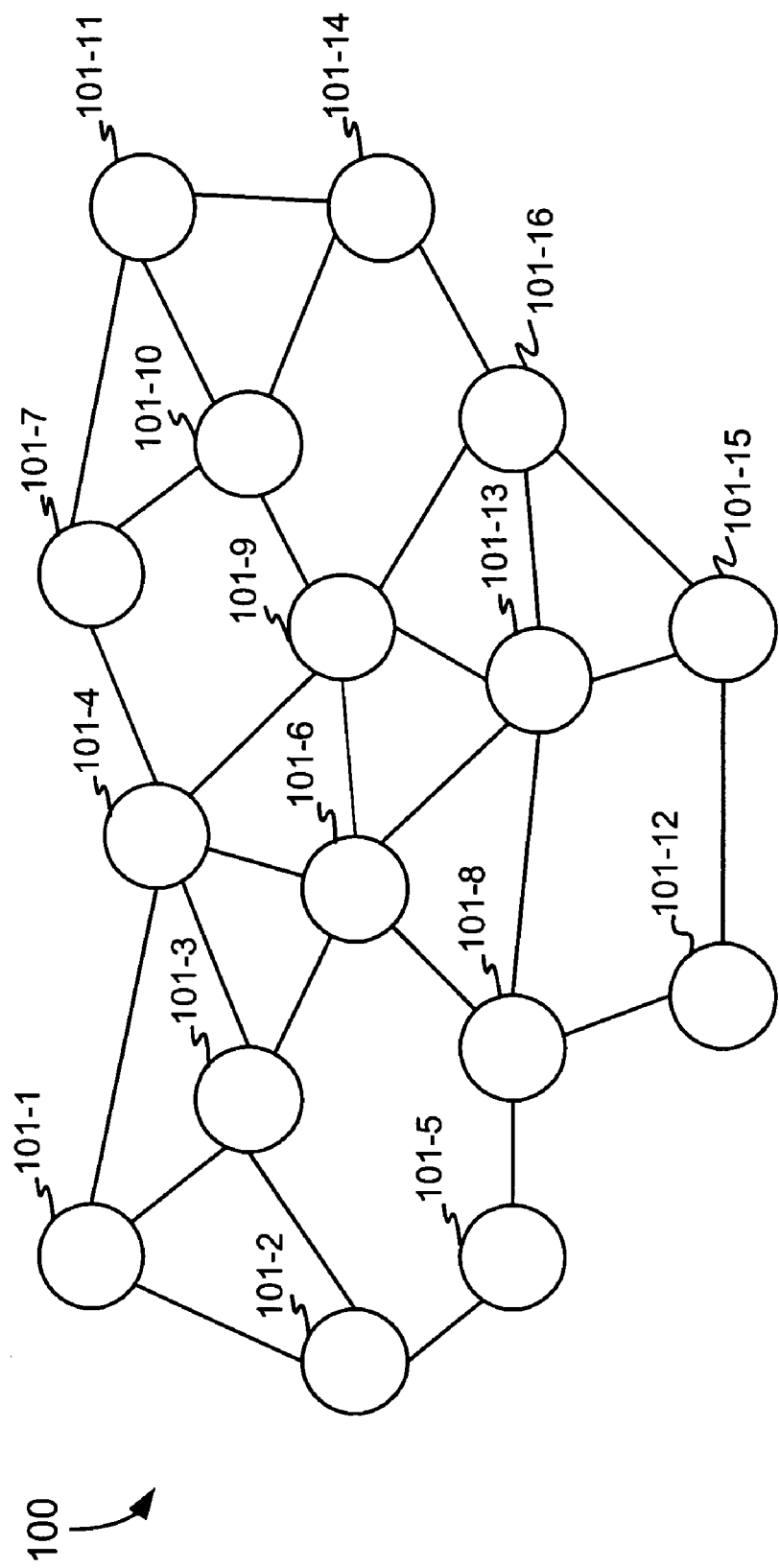
FIG. 1 illustrates an exemplary ad hoc network that may be used with implementations consistent with principles of the invention.

FIG. 1 is a diagram illustrating an exemplary ad-hoc network 100 in which implementations consistent with principles of the invention may operate. Ad-hoc network 100 may include a number of nodes 101-1 through 101-16 (collectively referred to as nodes 101). Lines joining nodes 101 represent connectivity; that is, if two nodes 101 are connected by a line, the two nodes can communicate directly with one another. A message in network 100 can make its way through the network, hop-by-hop, until it reaches its destination node.

Exemplary Hardware Configuration

Figure 2:
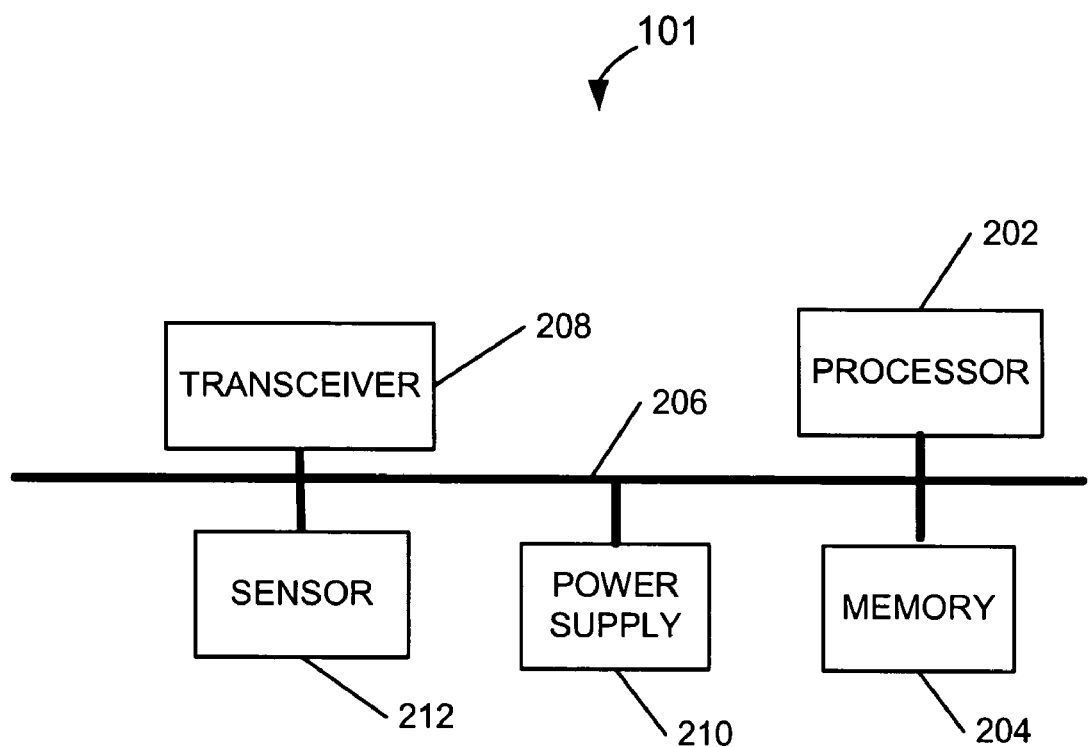
FIG. 2 is a block diagram of a node, consistent with the principles of the invention.

FIG. 2 illustrates an exemplary configuration of node 101 that may be used in network 100. Exemplary node 101 may include a processor 202, a memory 204, a bus 206, a transceiver 208, a power supply 210, and a sensor 212.

Processor 202 may be a conventional microcomputer, micro-controller, Digital Signal Processor (DSP), logic, such as a Field Programmable Gate Array (FPGA) or Application Specific Integrated Circuit (ASIC), or any other device capable of controlling node 101 and processing signals.

Memory 204 may include static memory, such as Non-volatile Random Access Memory (NVRAM) or flash memory for storing instructions and configuration parameters. Memory 304 may also include Dynamic Random Access Memory (DRAM), or any other convenient form of memory for use as working storage during operation of node 101.

Bus 206 may provide a path through which the various components of node 101 may communicate with one another.

Transceiver 208 may include a receiving portion and a transmitting portion that are capable of modulating messages via radio frequency (RF) over a wireless channel. In one implementation, transceiver 208 may perform such functions as converting bits to chips, inserting preambles (for example, to provide synchronization patterns for a receive modem), adding error correction features, such as Forward Error Correction codes, and providing power level indications.

Transceiver 208 also may be capable of demodulating messages received by an antenna. In one implementation, transceiver 208 may perform functions, such as detection of synchronization preambles, Viterbi decoding, and application of error codes.

Sensor 212 may optionally be provided for sensor network nodes. Sensor 212 may include a video sensor, for still or moving images, an acoustic sensor, a magnetic sensor, or other types of sensors. An ad hoc wireless sensor network may, for example, be used to gather environmental data for a particular area in which the nodes are placed.

Power supply 210 may be provided to power node 101. Power supply 210 may include, for example, one or more batteries, solar collectors, and ambient energy scavengers.

Figure 3:
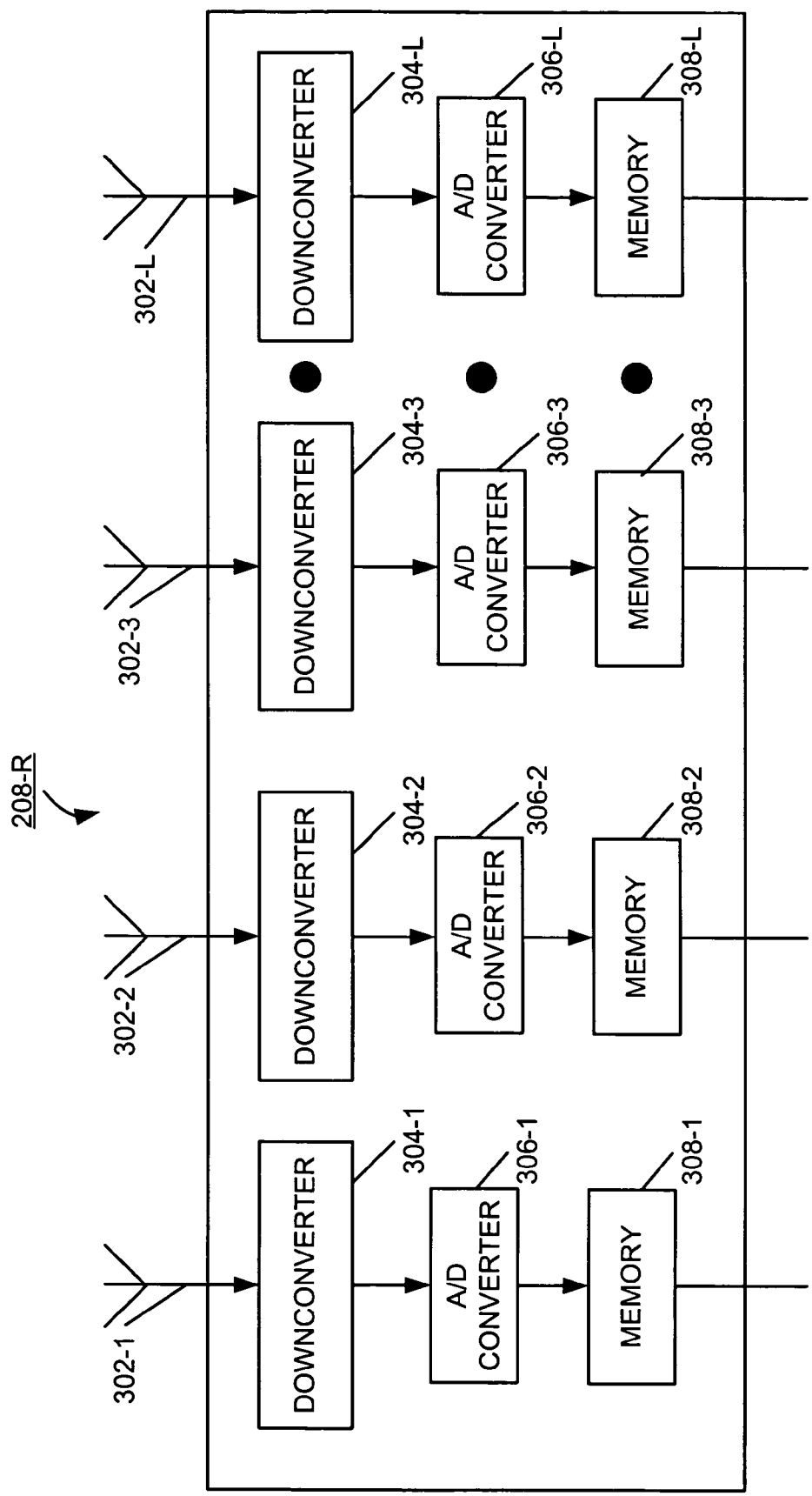
FIG. 3 is a detailed block diagram of a receiving portion of a transceiver consistent with the invention.

FIG. 3 provides a more detailed view of a receiving portion 208-R of transceiver 208. Receiving portion 208-R may include antenna array elements 302-1 through 302-L (collectively referred to as antenna array elements 302), downconverters 304-1 through 304-L (collectively referred to as downconverters 304), analog-to-digital (A/D) converters 306-1 through 306-L (collectively referred to as A/D converters 306), and memories 308-1 through 308-L (collectively referred to as memories 308). The receiving portion of transceiver 208, shown in FIG. 3 is exemplary and may have more, fewer, or different components than as illustrated in FIG. 3.

RF signals may be received via antenna elements 302 and may be passed to respective downconverters 304 for conversion from RF to a baseband frequency signals. A/D converters 308 may convert the baseband signals from respective downconverters 304 from analog form to digital form. The digital signals may then be stored in respective memories 308.

In other implementations, memories 308 may be one memory accessible by all A/D converters 306.

Exemplary Operation

Each node 101 in an ad hoc network may periodically transmit heartbeat packets (or "beacons"). Each heartbeat packet transmitted by node 101 may include an identifier of transmitting node 101, identifiers of neighboring nodes 101 from which transmitting node 101 has recently received a heartbeat packet, a location of transmitting node 101 ($p_{re-}$ $_{ported}$) and a velocity of transmitting node 101 ($v_{reported}$). Transmitting node 101 may determine its location via an on-board global positioning system (GPS) and may determine an expected velocity vector by, for example, extrapolation from previous locations, or by on-board mission plans.

When receiving node 101 receives a heartbeat packet from a neighboring node 101, receiving node 101 may update a table of reported positions and velocities of all currently known neighboring nodes 101. When node 101 determines that any of neighboring nodes 101 have not been heard from for a predetermined period of time, unheard-from neighboring nodes 101 are assumed to be gone and node 101 may remove location and velocity information, pertaining to the unheard-from neighboring nodes 101, from the table of reported positions and velocities. As will be discussed below, each node 101 may maintain a set of weights corresponding to each known neighboring node 101. When node 101 removes location and velocity information pertaining to an unheard-from neighboring node 101, node 101 may also remove the weight set corresponding to the unheard-from neighboring node 101.

Assuming that an adaptive antenna array has L elements, the L elements may detect a beginning and ending of a signal that may include an arriving packet. Antenna array elements 302 may detect the signal by detecting an RF signal having at least a predetermined signal strength coupled with detection of at least some acquisition and timing bits that may be included in a header of each packet. When a packet is detected, each antenna array element 302-1 through 302-L may pass the received signal to a different downconverter 304. Downconverters 304 may downconvert the received signal from RF to baseband frequency and may pass the downconverted signal to different A/D converters 306. A/D converters 306 may digitize the downconverted signals and may record the digitized signal (or waveform) in memories 308. Once a complete waveform is recorded in memories 308, processor 202 may access the waveform in memories 308 via bus 206 and may generate a group of output signals. Processor 202 may then select an error-free one of the output signals for further processing. We refer to this approach as a "store-and-process" approach. Alternatively, to improve latency, processor 202 may access the waveforms after enough, but not necessarily all, of the waveform has been recorded in memories 308, generate a group of output signals and select a strongest signal from the group of output signals for further processing. We refer to this approach as a "process-live" approach.

After hearing from a neighboring node 101, processor 202 may update its internal estimate of a location of neighboring node 101 and may create a set of weights, w, for known neighboring node 101. The sets of weights, w, for all k known neighboring nodes, as well as a weight set for an omnidirectional pattern may be stored in memories 308 and/or memory 204. Upon initialization, only the omnidirectional weight set may be known and stored in memories 308 and/or memory 204. The weight sets, w, may be created to maximize gain in a direction of transmitting node 101, while minimizing gain (maximizing null) in directions of all other known neighbors. A number of techniques are well known and may be used for deriving the weight sets, w. After at least enough of a received signal, received via antenna array elements 302, has been received and stored, processor 202 may access the stored received signal and may apply each of the k+1 weight sets to the received signal to generate k+1 output signals. Each weight set includes L weights, one weight corresponding to each of the L antenna array elements 302. When using the "store-and-process" approach, processor 202 may determine a first one of the k+1 output signals that is received error-free and provide that signal to the system for further processing. When using the "process live" approach, processor 202 may determine a strongest output signal from among the k+1 output signals and provide that signal for further processing. Using either approach, processor 202 may then determine whether the received packet is a heartbeat packet, including location information and velocity information. If the received packet is a heartbeat packet, then processor 202 may determine whether receiving node 101 has a line-of-sight connection with transmitting node 101. The weight set corresponding to the transmitting node 101 may then be updated based on an expected position of transmitting node 101 between transmission of heartbeat messages, as described in more detail below.

Exemplary Processing ("Store-and-Process" Approach)

Figure 4A:
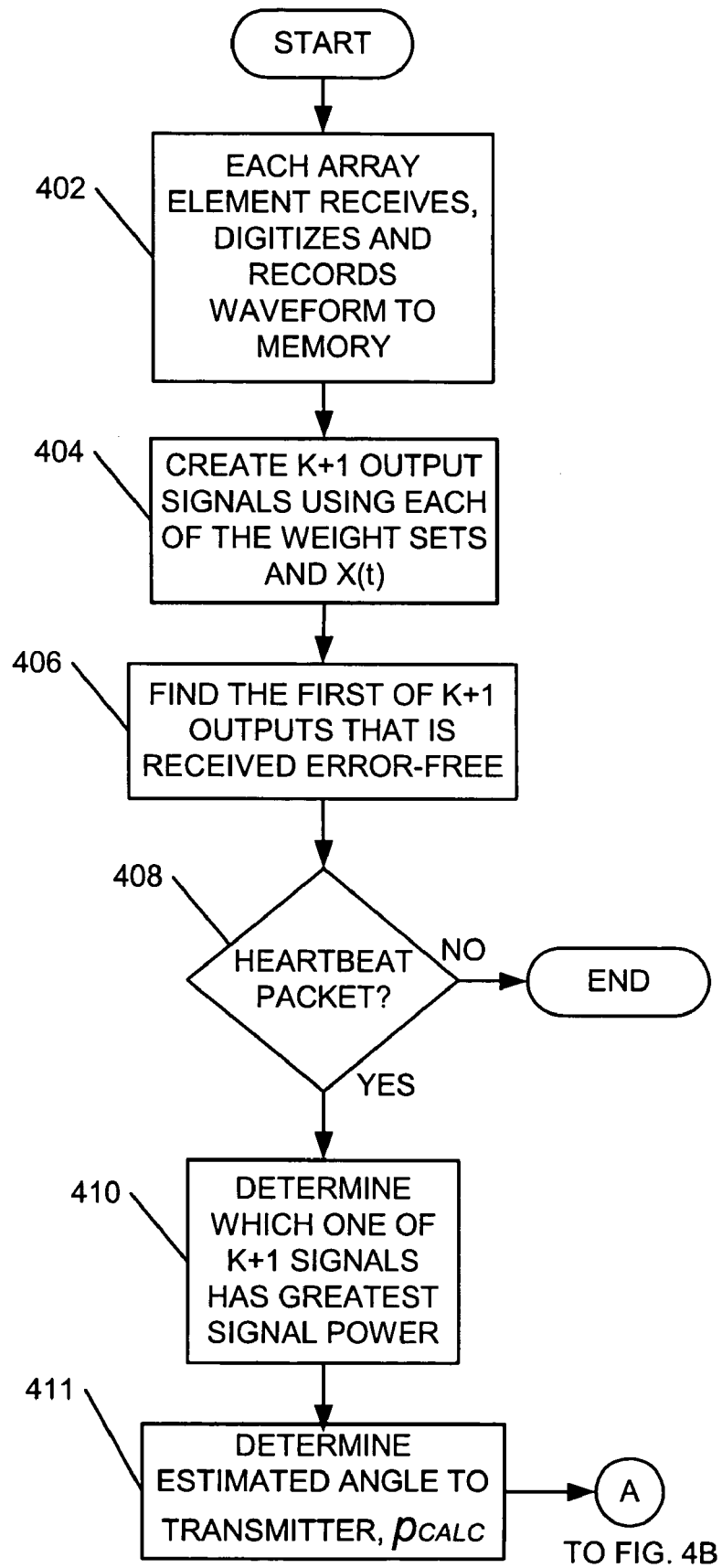
FIGS. 4A–4B are flowcharts that illustrate processing in an implementation of a node consistent with the principles of the invention.
Figure 4B:
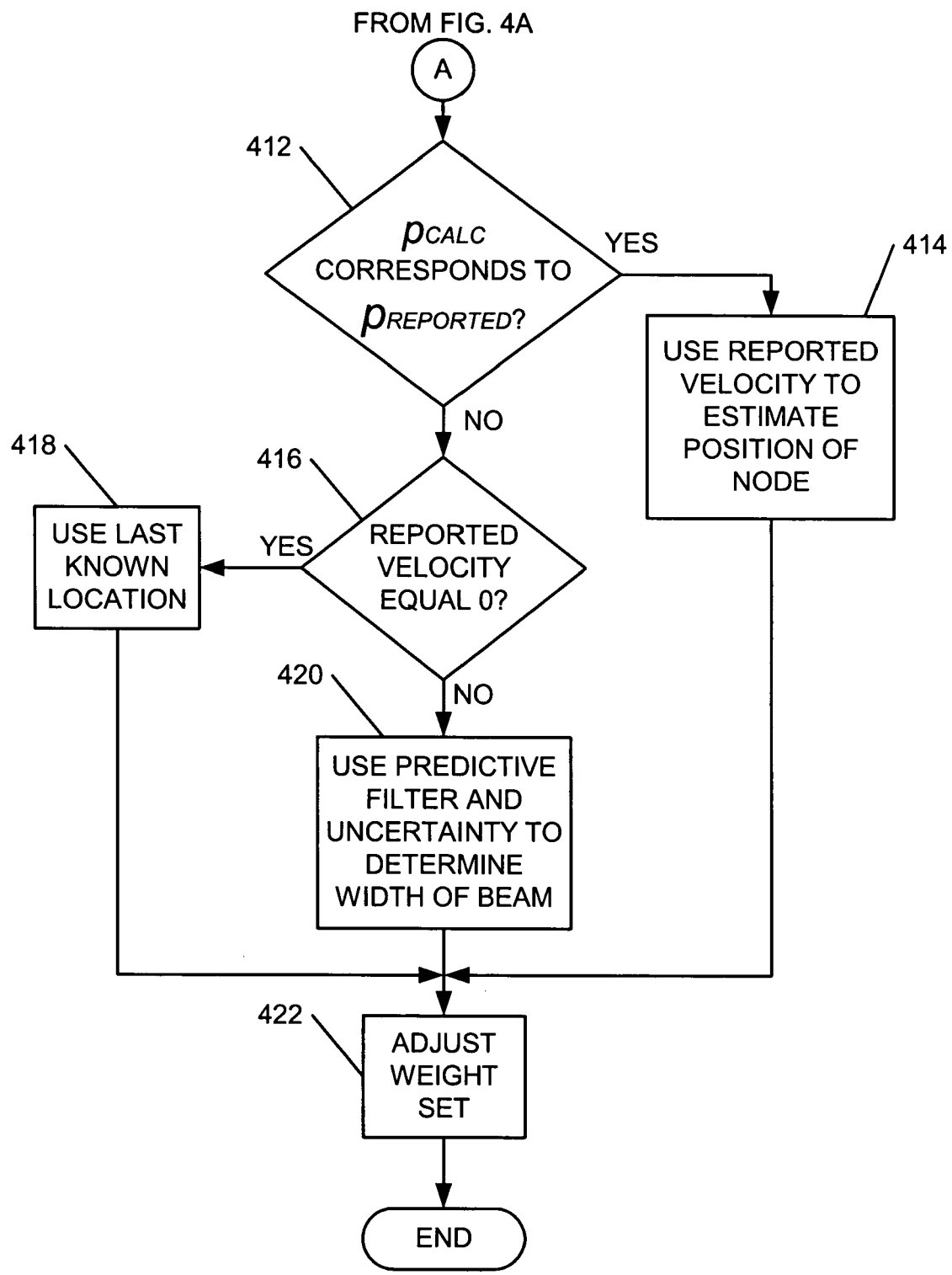

FIGS. 4A and 4B are flowcharts that illustrate exemplary processing in node 101 consistent with the principles of the invention. Processing may begin with receiver portion 208-R of transceiver 208 detecting a beginning of an arriving packet. Each of L antenna array elements 302 may receive an RF signal (waveform), respective downconverters 304 may downconvert the respective received signal to baseband frequency, each respective A/D converter 306 may convert the respective baseband signal to digital form, and each respective memory 308 may record the received waveform from corresponding A/D converter 306 (act 402). Thus, each of L antenna array elements 302 may receive the waveform and the waveform received, via each of the L antenna array elements 302, may be recorded to memories 308. After all of the waveform has been recorded, processor 202 may access the recorded waveform in memories 308 and weight sets, w, of k known neighbors to generate k output signals, where k is a number of known neighboring nodes 101. Processor 202 may generate a $(k+1)^{st}$ output signal using a stored set of weights for an omnidirectional propagation pattern. Each output signal is generated by applying a weight set to a waveform received via antenna array elements 302. The output signals corresponding to the k known neighbors may be of the form $y_k(t)=w_k^H x(t)$, where $w_k^H$ is a complex conjugate of a transpose of a vector of all L signals (assuming there are L antenna array elements 302) and x(t) is the transpose of the vector of all L signals (act 404).

After generating the k+1 output signals, processor 202 may find a first one of the k+1 output signals that is received error-free and may pass the error-free output signal to other processes within node 101 for further processing (act 406). Processor 202 may then decode the received packet included in the output signal and may determine whether the packet included in the selected output signal is a heartbeat packet (act 408). If the packet is not a heartbeat packet, then the exemplary process is completed. If the packet is a heartbeat packet, then processor 202 may determine which of the k+1 output signals is strongest (act 410). Note that when receiving node 101 receives a signal from a previously unknown node, the output signal corresponding to the omnidirectional propagation pattern may be the strongest signal because the signal is being received from an unexpected node position. Processor 202 may calculate an estimated angle ($p_{calc}$) to the transmitting node (act 411). Processor 202 may calculate estimated angle ($p_{calc}$) by using a well-known technique in which eigenvalues of an array correlation matrix are used. If receiving node 101 has line-of-sight connectivity, then $p_{calc}$ is the direction of transmitting node 101. If the line-of-sight is obscured, then $p_{calc}$ may be a direction of a strongest multipath signal.

In order to determine whether $p_{calc}$ is the estimated angle to transmitting node 101, processor 202 may determine whether $p_{calc}$ corresponds to a reported position of the transmitting node 101 ($p_{reported}$) which may be included in the received heartbeat message (act 412: FIG. 4B). If $p_{calc}$ corresponds to $p_{reported}$, then receiving node 101 has line-of-sight connectivity to transmitting node 101 and reported velocity ($V_{reported}$) from the received heartbeat message, is used to estimate a position of transmitting node 101 between heartbeat messages (act 414).

If $p_{calc}$ does not correspond to $p_{reported}$, then a multipath signal was received and the reported location of transmitting node 101 may not be used as an accurate estimator of the best propagation pattern to use to receive signals from transmitting node 101. Processor 202 may then determine whether $V_{reported}$ equals 0 (act 416). If $V_{reported}$ is 0, then transmitting node 101 may not be moving and processor 202 may use a last known location of transmitting node 101 to estimate a position of transmitting node 101 (act 418). Thus, for rapidly moving vehicles, implementations consistent with the principles of the invention may assume that a vector between a transceiver of transmitting node 101 and a transceiver of receiving node 101 will generally be a more reliable direction than any temporary multipath signal direction.

If processor 202 determines that $V_{reported}$ is not 0, then the transmitting node is moving and processor 202 may send information regarding past movement of the transmitting node through a Kalman filter, or a similar predictive filter that may be implemented by processor 202, to estimate a position of transmitting node 101 (act 420). Processor 202 may use uncertainty of the estimate by the predictive filter to determine a width of a beam pattern to generate.

Processor 202 may then update the weight set, w, corresponding to transmitting node 101, based on the estimated position of transmitting node 101 (from acts 418, 420 or from act 414) (act 422). Any well-known technique may be used to update the weight set, w.

Figure 4C:
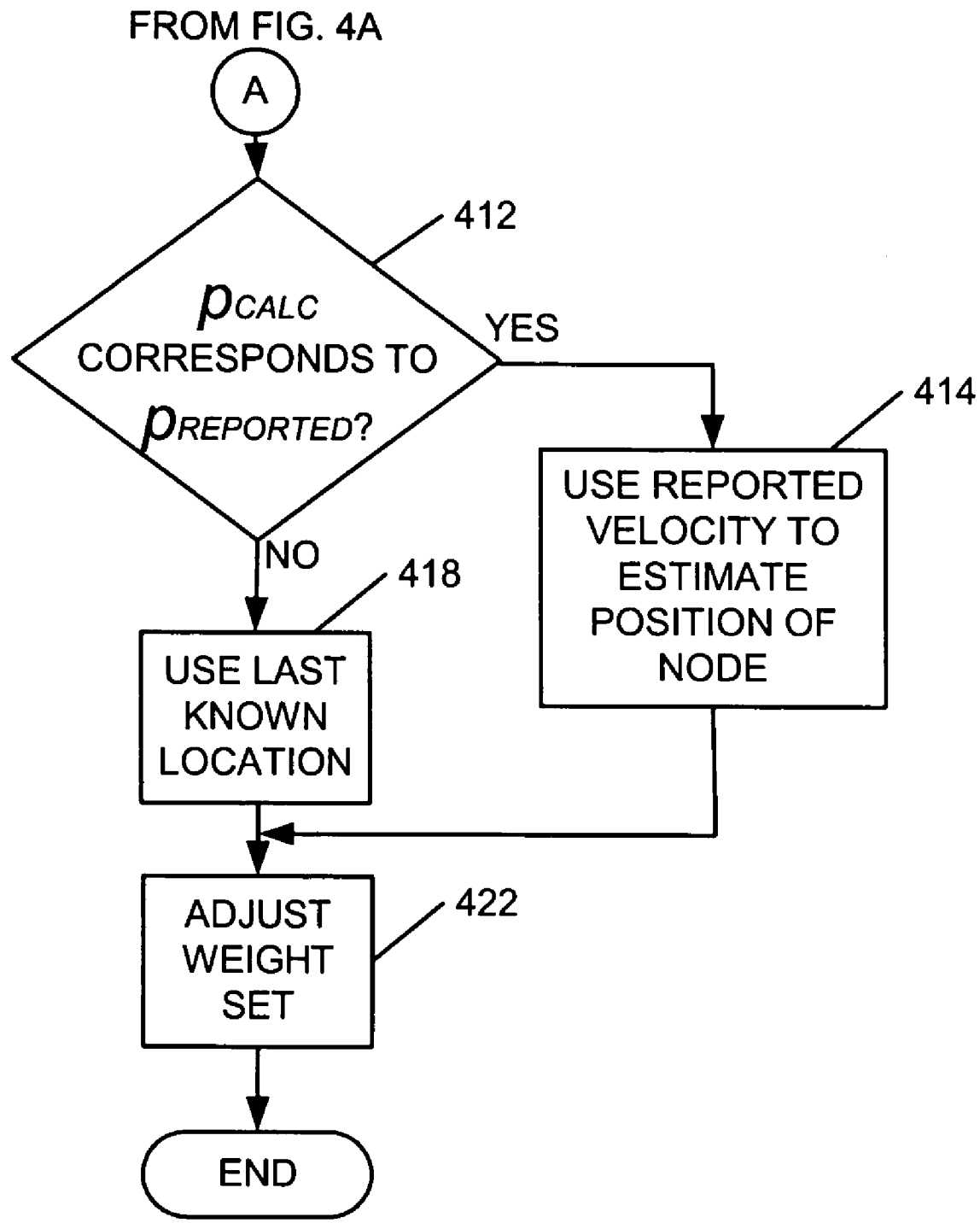
FIG. 4C is a portion of a flowchart that illustrates processing in an alternative implementation of a node consistent with the principles of the invention.

Alternatively, when processor 202 determines that $p_{calc}$ does not correspond to $p_{reported}$ (act 412), processor 202 may use the last known position of transmitting node 101 to estimate a position of the transmitting node (act 418), as illustrated in FIG. 4C.

Exemplary Processing ("Process-Live" Approach)

Figure 5A:
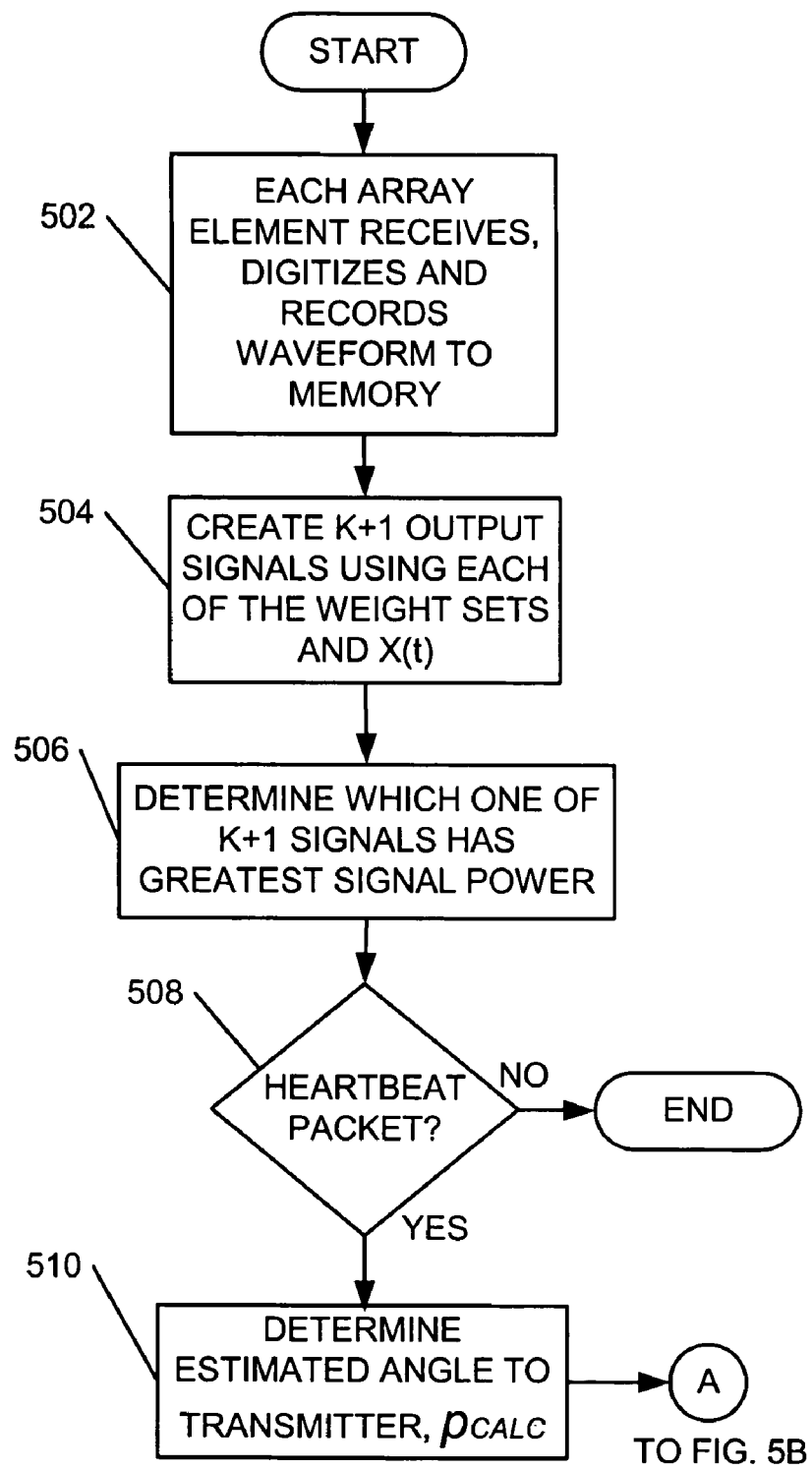
FIGS. 5A–5B are flowcharts that illustrate processing in another implementation of a node consistent with the principles of the invention.
Figure 5B:
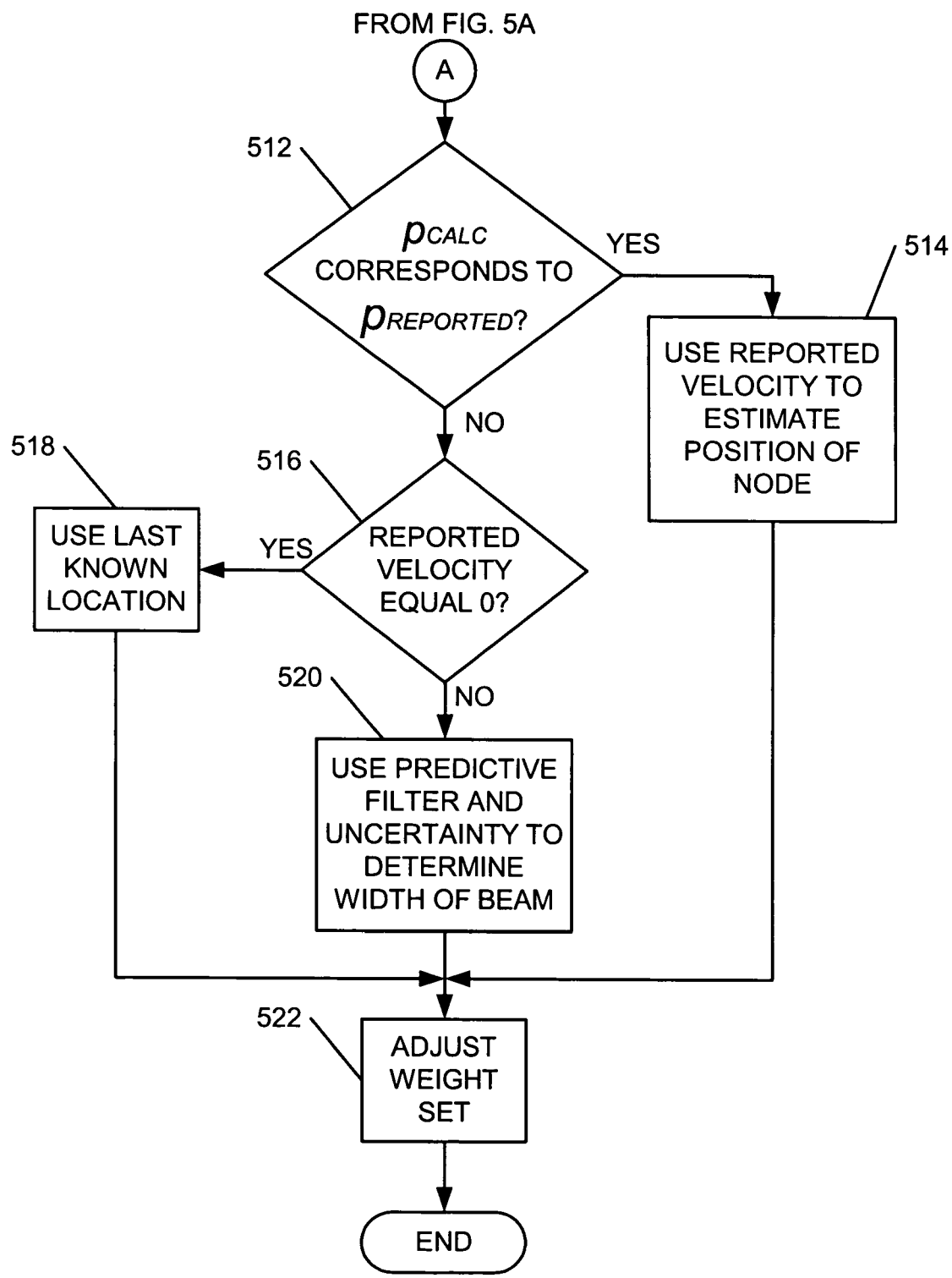

FIGS. 5A and 5B are flowcharts that illustrate exemplary processing in node 101 consistent with the principles of the invention. Processing may begin with receiver portion 208-R of transceiver 208 detecting a beginning of an arriving packet. Each of L antenna array elements 302 may receive an RF signal (waveform), respective downconverters 304 may downconvert the respective received signal to baseband frequency, each respective A/D converter 306 may convert the respective baseband signal to digital form, and each respective memory 308 may record the received waveform from corresponding A/D converter 306 (act 502). Thus, each of L antenna array elements 302 may receive the waveform and the waveform received, via each of the L antenna array elements 302, may be recorded to memories 308. After at least a portion of the waveform has been recorded, processor 202 may access the recorded waveform in memories 308 and weight sets, w, of k known neighbors to generate k output signals, where k is a number of known neighboring nodes 101. Processor 202 may generate a $(k+1)^{st}$ output signal using a stored set of weights for an omnidirectional propagation pattern. Each output signal is generated by applying a weight set to a waveform received via antenna array elements 302. As described previously, the output signals corresponding to the k known neighbors may be of the form $y_k(t)=w_k^H x(t)$, where $w_k^H$ is a complex conjugate of a transpose of a vector of all L signals (assuming there are L antenna array elements 302) and x(t) is the transpose of the vector of all L signals (act 504).

After generating the k+1 output signals, processor 202 may find a strongest one of the k+1 output signals that is received and may pass the strongest output signal to other processes within node 101 for further processing (act 506). Processor 202 may then decode at least the received portion of a packet included in the strongest output signal and may determine whether the packet included in the strongest output signal is a heartbeat packet (act 508). If the packet is not a heartbeat packet, then the exemplary process is completed. If the packet is a heartbeat packet, then processor 202 may calculate an estimated angle ($p_{calc}$) to the transmitting node (act 510). Processor 202 may calculate estimated angle ($p_{calc}$) by using a well-known technique in which eigenvalues of an array correlation matrix are used. If receiving node 101 has line-of-sight connectivity, then $p_{calc}$ is the direction of transmitting node 101. If the line-of-sight is obscured, then $p_{calc}$ may be a direction of a strongest multipath signal. Note that when receiving node 101 receives a signal from a previously unknown node, the output signal corresponding to the omnidirectional propagation pattern may be the strongest signal because the signal is being received from an unexpected node position.

In order to determine whether $p_{calc}$ is the estimated angle to transmitting node 101, processor 202 may determine whether $p_{calc}$ corresponds to a reported position of the transmitting node 101 ($p_{reported}$) which may be included in the received heartbeat message (act 512: FIG. 5B). If $p_{calc}$ corresponds to $p_{reported}$, then receiving node 101 has line-of-sight connectivity to transmitting node 101 and reported velocity ($V_{reported}$) from the received heartbeat message, is used to estimate a position of transmitting node 101 between heartbeat messages (act 514).

If $p_{calc}$ does not correspond to $p_{reported}$, then a multipath signal was received and the reported location of transmitting node 101 may not be used as an accurate estimator of the best propagation pattern to use to receive signals from transmitting node 101. Processor 202 may then determine whether $V_{reported}$ equals 0 (act 516). If $V_{reported}$ is 0, then transmitting node 101 may not be moving and processor 202 may use a last known location of transmitting node 101 to estimate a position of transmitting node 101 (act 518). Thus, for rapidly moving vehicles, implementations consistent with the principles of the invention may assume that a vector between a transceiver of transmitting node 101 and a transceiver of receiving node 101 will generally be a more reliable direction than any temporary multipath signal direction.

If processor 202 determines that $V_{reported}$ is not 0, then the transmitting node is moving and processor 202 may send information regarding past movement of the transmitting node through a Kalman filter, or a similar predictive filter that may be implemented by processor 202, to estimate a position of transmitting node 101 (act 520). Processor 202 may use uncertainty of the estimate by the predictive filter to determine a width of a beam pattern to generate.

Processor 202 may then update the weight set, w, corresponding to transmitting node 101, based on the estimated position of transmitting node 101 (from acts 518, 520 or from act 514) (act 522). Any well-known technique may be used to update the weight set, w.

Figure 5C:
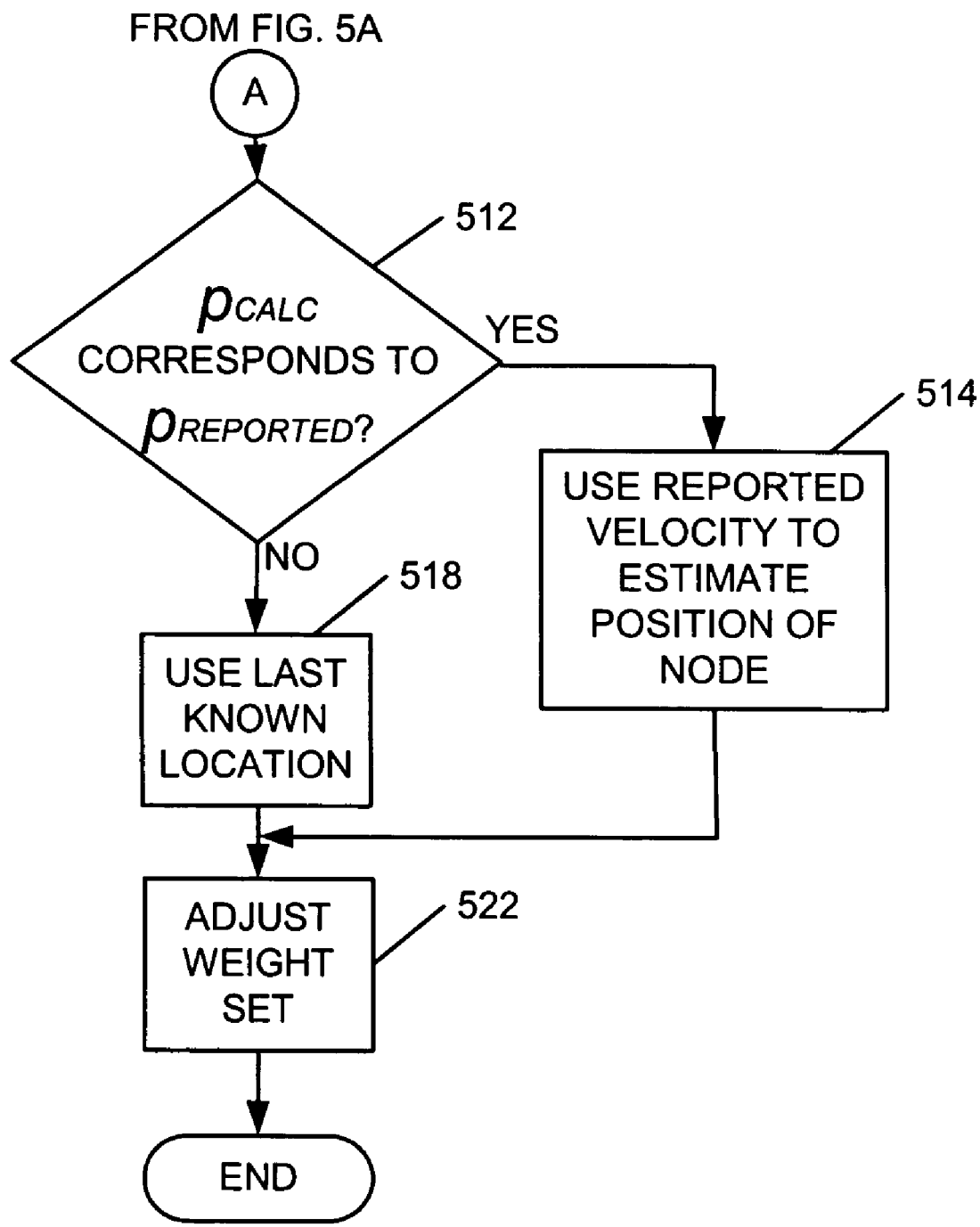
FIG. 5C is a portion of a flowchart that illustrates processing in an alternative implementation of a node consistent with the principles of the invention.

Alternatively, when processor 202 determines that $p_{calc}$ does not correspond to $p_{reported}$ (act 512), processor 202 may use the last known position of transmitting node 101 to estimate a position of the transmitting node (act 518), as illustrated in FIG. 5C.

Variations

The exemplary processing of FIGS. 4A–4C and 5A–5C illustrates that when a heartbeat packet is received, further processing is performed. Alternatively, $V_{reported}$ and $p_{reported}$ may be provided, for example, in a header field in other packets, or possibly all packets. Thus, instead of checking whether a heartbeat packet is received, (act 408: FIG. 4A and act 508: FIG. 5A) processor 202 may, instead, check whether the received packet includes $V_{reported}$ and $p_{reported}$, and if so, processor 202 may continue processing of acts 411–422 (FIG. 4B) or acts 511–522 (FIG. 5B), as previously described.

CONCLUSION

Systems and methods consistent with the principles of the invention dynamically determine a best direction for a gain or a null after or during a time when a signal is being received from a transmitting node. Implementations consistent with the principles of the invention reduce multiple access interference, improve signal strength, and thereby, improve a network's data carrying capacity.

The foregoing description of preferred embodiments of the invention provides illustration and description, but is not intended to be exhaustive or to limit the invention to the precise form disclosed. Modifications and variations are possible in light of the above teachings or may be acquired from practice of the invention for example, while series of acts have been described with regard to FIGS. 4A–4C and 5A–5C, the order of the acts may differ in other implementations consistent with the present invention. Also, non-dependent acts may be performed in parallel. In addition, although implementations of the invention were described as applying to a wireless ad hoc network, implementations of the invention are not limited to wireless ad hoc networks. For example, implementations consistent with the principles of the invention may be used with other types of wireless networks, such as, a wireless network that uses base stations (e.g., a cell phone tower system).

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for dynamically adjusting a beam of an adaptive antenna array, the method comprising:
   receiving in a receiving node, via a plurality of antenna array elements, a signal from a transmitting node;
   digitizing the received signal from the antenna array elements;
   recording the digitized received signal;
   generating k+1 output signals from the recorded digitized signal, by applying each of a plurality of weight sets to the digitized signal, each of the weight sets corresponding to a different one of k known neighboring nodes and a weight set for generating an omnidirectional propagation pattern;
   determining which one of the k+1 output signals to process; and
   processing the one of the k+1 output signals and decoding a packet encoded in the one of the k+1 output signals.

2. The method of claim 1, wherein the determining further comprises:
   finding an error-free one of the k+1 output signals, and
   determining that the error-free one of the k+1 output signals is the one of the k+1 output signals to process.

3. The method of claim 1, wherein the determining further comprises:
   finding a strongest one of the k+1 output signals, and
   determining that the strongest one of the k+1 output signals is the one of the k+1 output signals to process.

4. The method of claim 1, further comprising:
   when the decoded packet includes location information of the transmitting node:
      determining whether a line-of sight connection exists with the transmitting node;
      when the determining determines that the line-of sight connection exists:
         using the location information to estimate a position of the transmitting node, and
         adjusting the weight set corresponding to the transmitting node based on the estimated position of the transmitting node.

5. The method of claim 4, wherein:
   the decoded packet including the location information is a heartbeat packet.

6. The method of claim 4, wherein the location information includes a reported position and a reported velocity of a transmitting node.

7. The method of claim 4, wherein:
   the determining whether a line-of-sight connection exists comprises:
      estimating an angle to the transmitting node, and
      determining whether the estimated angle to the transmitting node corresponds to a reported position of the transmitting node, included in the location information.

8. The method of claim 4, wherein
   when the determining whether a line-of sight connection exists determines that a line-of-sight connection does not exist:
      using a last known location of the transmitting node as an estimate of a position of the transmitting node, and
      adjusting weights of the weight set corresponding to the transmitting node based on the estimate of the position of the transmitting node.

9. The method of claim 4, wherein
   when the determining whether a line-of sight connection exists determines that a line-of-sight connection does not exist:
      determining whether the transmitting node is moving,
      when the determining whether the transmitting node is moving determines that the transmitting node is not moving:
         using a last known location of the transmitting node as an estimate of a position of the transmitting node, and adjusting weights of the weight set corresponding to the transmitting node based on the estimate of the position of the transmitting node.

10. The method of claim 4, wherein
when the determining whether a line-of sight connection exists determines that a line-of-sight connection does not exist:
determining whether the transmitting node is moving,
when the determining whether the transmitting node is moving determines that the transmitting node is moving:
providing a predictive filter with information concerning past movement of the transmitting node,
providing, by the predictive filter, an estimated position of the transmitting node, and
adjusting the weight set corresponding to the transmitting node based on the estimated position of the transmitting node.

11. The method of claim 10, wherein:
the predictive filter includes a Kalman filter.

12. The method of claim 10, wherein:
adjusting the weight set further comprises adjusting the weight set based on an uncertainty of the estimated position provided by the predictive filter.

13. The method of claim 1, wherein the receiving comprises:
detecting, by each of the array elements, a beginning of a packet.

14. The method of claim 13, wherein the detecting a beginning of a packet comprises:
detecting at least a predetermined radio frequency signal strength and detecting at least some acquisition and timing bits in a packet header.

15. The method of claim 1, wherein the recording comprises:
storing the digitized received signal in a memory.

16. The method of claim 1, wherein:
the receiving node and the transmitting node are included in a wireless ad hoc network.

17. A node configured to operate in a wireless network, the node comprising:
a transceiver including a plurality of antenna array elements and a memory, the transceiver being configured to:
receive, from a transmitting node, a signal via the plurality of antenna array elements and detect a beginning of a packet in the signal, and
store, in the memory, respective portions of the signal received via corresponding ones of the antenna array elements, and
a processor connected to the transceiver and configured to:
access the stored portions of the received signal from the memory,
generate k+1 output signals based on the stored portions of the received signal, wherein each of the output signals is generated using a different one of a plurality of weight sets, the weight sets corresponding to k known neighboring nodes and a weight set for generating an omnidirectional propagation pattern,
determine which one of the k+1 output signals to process, and
process the one of the k+1 output signals and decode the packet encoded in the one of the k+1 output signals.

18. The node of claim 17, wherein the processor being configured to determine which one of the k+1 output signals to process, further comprises the processor being configured to:
find an error-free one of the k+1 output signals, and
determine that the error-free one of the k+1 output signals is the one of the k+1 output signals to be processed.

19. The node of claim 17, wherein the processor being configured to determine which one of the k+1 output signals to process, further comprises the processor being configured to:
find a strongest one of the k+1 output signals, and
determine that the strongest one of the k+1 output signals is the one of the k+1 output signals to be processed.

20. The node of claim 17, wherein the processor is further configured to:
determine whether the decoded packet includes location information of a transmitting node,
when the processor determines that the decoded packet includes the location information, the processor is further configured to:
determine whether the plurality of antenna array elements are receiving a line-of-sight signal from the transmitting node,
when the processor determines that the plurality of antenna array elements are receiving a line-of-sight signal, the processor is further configured to
estimate a position of the transmitting node based on the heartbeat packet, and
adjust the weight set corresponding to the transmitting node based on the estimated position of the transmitting node.

21. The node of claim 20, wherein the location information includes a reported position and a reported velocity.

22. The node of claim 17, wherein the transceiver further comprises
a plurality of downconverters, each of the downconverters being coupled to a different one of the antenna array elements,
a plurality of analog-to-digital converters, each of the analog-to-digital converters being coupled to a different one of the downconverters, and
a memory coupled to the analog-to-digital converters and further coupled to the processor, wherein:
the downconverters are configured to receive the portions of the signal from the ones of the antenna array elements and downconvert the portions of the received signal from a radio frequency to a baseband frequency, and
the analog-to-digital converters are configured to digitize the downconverted portions of the received signal and to store the portions of the digitized downconverted signal in the memory.

23. The node of claim 20, wherein:
the processor being configured to determine whether the plurality of antenna array elements are receiving a line-of-sight signal from the transmitting node, further comprises the processor being configured to:
estimate an angle from the antenna array elements to the transmitting node, and
determine whether the estimated angle corresponds to the location information.

24. The node of claim 20, wherein:
when the processor determines that the plurality of antenna elements are not receiving a line-of-sight signal from the transmitting node, the processor is further configured to:

use a last known location of the transmitting node as an estimate of the position of the transmitting node, and adjust weights of the weight set corresponding to the transmitting node based on the estimate of the position of the transmitting node.

25. The node of claim 20, wherein:

when the processor determines that the plurality of antenna elements are not receiving a line-of-sight signal from the transmitting node, the processor is further configured to:

determine whether the transmitting node is moving, when the processor determines that the transmitting node is not moving, the processor is further configured to:

use a last known location of the transmitting node as an estimate of the position of the transmitting node, and adjust weights of the weight set corresponding to the transmitting node based on the estimate of the position of the transmitting node.

26. The node of claim 20, wherein:

when the processor determines that the plurality of antenna elements are not receiving a line-of-sight signal from the transmitting node, the processor is further configured to:

determine whether the transmitting node is moving, when the processor determines that the transmitting node is moving, the processor is further configured to:

provide a predictive filter with information concerning past movement of the transmitting node, receive an estimated position of the transmitting node from the predictive filter, and adjust the weight set pertaining to the transmitting node based on the estimated position of the transmitting node.

27. The node of claim 26, wherein the processor being configured to determine whether the transmitting node is moving, further comprises the processor being farther configured to:

determine whether a reported velocity, included in the location information, is non-zero.

28. The node of claim 26, wherein the predictive filter includes a Kalman filter.

29. The node of claim 26 wherein the processor being configured to adjust the weight set corresponding to the transmitting node based on the estimated position of the transmitting node, further comprises the processor being configured to:

adjust the weight set corresponding to the transmitting node based on uncertainty of the estimated position of the transmitting node from the predictive filter.

30. The node of claim 17, wherein the transceiver being configured to detect a beginning of a packet, further comprises the transceiver being configured to:

detect a radio frequency signal having at least a predetermined signal strength and detecting at least some acquisition and timing bits in a packet header.

31. A machine-readable medium having instructions recorded thereon for a processor, when the instructions are executed by the processor, the processor is configured to:

access a plurality of recorded waveforms in a memory, each of the recorded waveforms having been received via a different one of a plurality of antenna array elements, apply each of k+1 weight sets to the recorded waveforms to generate k+1 output signals, k of the weight sets corresponding to k known neighboring nodes and one of the weight sets being a predetermined weight set for generating an omnidirectional propagation pattern, and determine which one of the k+1 output signals to process and process the determined one of the k+1 output signals, the processing including decoding a received packet encoded in the one of the k+1 output signals.

32. The machine-readable medium of claim 31, the processor being configured to determine which one of the k+1 output signals to process further comprises the processor being configured to:

find an error-free one of the k+1 output signals, and determine that the error-free one of the k+1 output signals is the one of the k+I output signals to process.

33. The machine-readable medium of claim 31, the processor being configured to determine which one of the k+I output signals to process further comprises the processor being configured to:

find a strongest one of the k+1 output signals, and determine that the strongest one of the k+1 output signals is the one of the k+1 output signals to process.

34. The machine-readable medium of claim 31, the processor further being configured to:

determine whether the decoded packet includes location information of a transmitting node, when the decoded packet is determined to include the location information, the processor is further configured to:

determine whether a line-of-sight connection exists with a transmitting node, when the processor determines that the line-of sight connection exists, the processor is further configured to:

estimate a position of the transmitting node based on the location information, and adjust weights of the weight set corresponding to the transmitting node based on the estimated position of the transmitting node.

35. The machine-readable medium of claim 34, wherein the location information includes a reported position and a reported velocity.

36. The machine-readable medium of claim 34, wherein the processor being configured to determine whether a line-of-sight connection exists, further comprises the processor being further configured to:

estimate an angle to the transmitting node, and determine whether the estimated angle to the transmitting node corresponds to the location information.

37. The machine-readable medium of claim 36, wherein the processor being configured to estimate the angle to the transmitting node, further comprises the processor being further configured to:

estimate the angle to the transmitting node based on eigenvalues of an array correlation matrix.

38. The machine-readable medium of claim 34, wherein when the processor determines that a line-of-sight connection does not exist, the processor is further configured to:

use a last known location of the transmitting node as an estimate of a position of the transmitting node, and adjust weights of the weight set corresponding to the transmitting node based on the estimate of the position of the transmitting node.

39. The machine-readable medium of claim 34, wherein when the processor determines that a line-of-sight connection does not exist, the processor is further configured to:

determine whether the transmitting node is moving, when the processor determines that the transmitting node is not moving, the processor is further configured to:
  use a last known location of the transmitting node as an estimate of a position of the transmitting node, and
  adjust weights of the weight set corresponding to the transmitting node based on the estimate of the –position of the transmitting node.

40. The machine-readable medium of claim 34, wherein when the processor determines that a line-of-sight connection does not exist, the processor is further configured to:
  determine whether the transmitting node is moving,
  when the processor determines that the transmitting node is moving, the processor is further configured to:
  use a predictive filter to estimate a position of the transmitting node based on past movement of the transmitting node, and
  adjust weights of the weight set corresponding to the transmitting node based on the estimate of the position of the transmitting node determined by the predictive filter.

41. The machine-readable medium of claim 40, wherein the processor being configured to adjust weights of the weight set corresponding to the transmitting node based on the estimate of the position of the transmitting node determined by the predictive filter, further comprises the processor being configured to:
  adjust the weights of the weight set corresponding to the transmitting node based on an uncertainty of the estimate of the position determined by the predictive filter.

42. The machine-readable medium of claim 40, wherein the predictive filter includes a Kalman filter.

43. A node configured to operate in a wireless network, the node comprising:
  means for receiving a signal from a transmitting node via a plurality of antenna array elements;
  means for storing a representation of the received signal;
  means for generating a plurality of output signals by applying each of a plurality of weight sets to the representation of the received signal, k of the weight sets corresponding to k known neighboring nodes and one of the weight sets being a predetermined weight set for propagating an omnidirectional pattern;
  means for determining which one of the plurality of output signals to process; and
  means for processing and for decoding the determined one of the plurality of output signals.

44. The node of claim 43, further comprising:
  means for determining whether a line-of-sight connection exists with the transmitting node;
  means for estimating a position of the transmitting node; and
  means for updating the weight set corresponding to the transmitting node based on the estimated position of the transmitting node.

* * * * *